Figure 1:
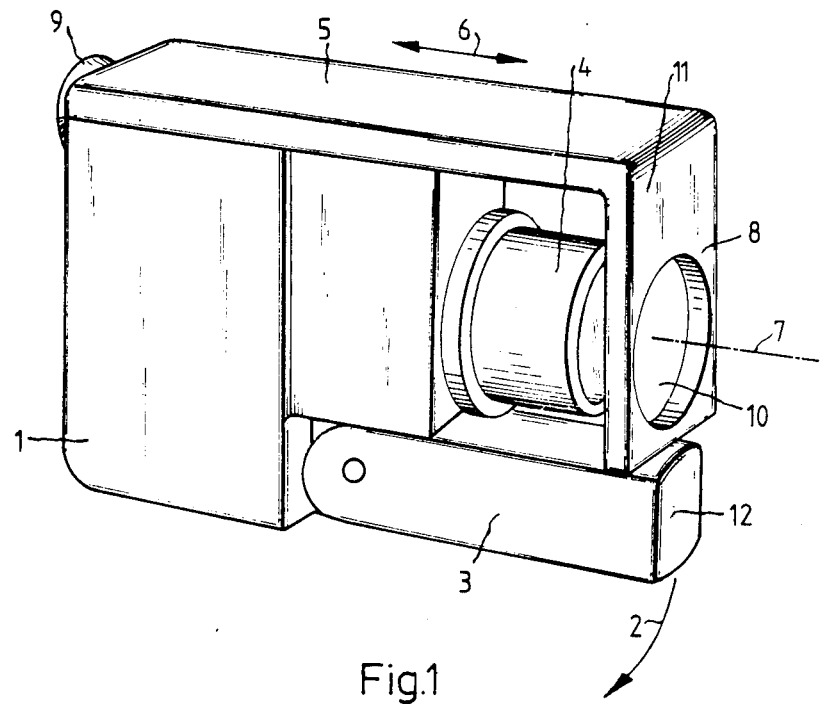

United States Patent [19]

Erxleben

[11] Patent Number: 4,673,267

[45] Date of Patent: Jun. 16, 1987

[54] VIDEO CAMERA

[75] Inventor: Tomas Erxleben, Hemmingen, Fed. Rep. of Germany

[73] Assignee: Deutsche AG für Unterhaltungselectronic OHG, Villingen-Schwenningen, Fed. Rep. of Germany

[21] Appl. No.: 870,116

[22] Filed: Jun. 3, 1986

[30] Foreign Application Priority Data

Jun. 7, 1985 [DE] Fed. Rep. of Germany ....... 3520459

[51] Int. Cl.$^4$ .................. G03B 13/02; G03B 17/02; G03B 21/14
[52] U.S. Cl. ..................................... 352/242; 352/95; 352/104; 354/219
[58] Field of Search .................. 352/95, 104, 242; 354/219, 223, 219 IF

[56] References Cited

U.S. PATENT DOCUMENTS

| 3,592,117 | 7/1971 | Fukuda | 354/219 |
| 3,599,553 | 8/1971 | Hansen et al. | 352/242 |
| 3,738,238 | 6/1973 | Hager | 354/219 |
| 3,941,464 | 3/1976 | Waaske | 354/219 |
| 4,008,372 | 12/1977 | Ueno et al. | |
| 4,032,940 | 6/1977 | Chan | 354/219 |

FOREIGN PATENT DOCUMENTS

| 2102341 | 8/1972 | Fed. Rep. of Germany | |
| 2212470 | 9/1973 | Fed. Rep. of Germany | |
| 2841606 | 8/1979 | Fed. Rep. of Germany | |
| 410619 | 10/1966 | Switzerland | 352/242 |

Primary Examiner—Monroe H. Hayes
Attorney, Agent, or Firm—Spencer & Frank

[57] ABSTRACT

A video camera is provided with a longitudinally sliding part (5) which in the forward end position forms a protection for the lens (4) and in the rearward end position uncovers the lens. In addition, the eyepiece (9) of the viewfinder is extended to maximum magnification in the rear end position.

10 Claims, 4 Drawing Figures

VIDEO CAMERA

The invention relates to a video camera as used in particular in connection with video recorders for home movies.

Video cameras of this type are relatively expensive and sensitive instruments and must therefore be carefully handled and protected during operation and transport. The storage and carrying of cameras of this type in special containers is already known.

The aim of the invention is to design a video camera so that it is protected as far as possible and may be put into operating mode particularly easily.

This aim is accomplished by the invention described in claim 1. Further advantageous developments of the invention are described in the subclaims.

In the embodiment according to the invention, the required protection for the video camera is thus not achieved by means of a carrying case, but by an advantageous design of the housing. The sliding part, which is a component of the camera housing, thus fulfils a plurality of functions. In the forward end position it provides an effective protection for the lens, the front of the latter being covered e.g. by a bracket on the sliding part. In the rearward end position, however, the lens is uncovered. In addition, according to an embodiment of the invention, an eyepiece for the viewfinder located on the sliding part is brought back in such a way that the viewfinder is set to maximum magnification. In addition, by moving the sliding part into the rearward end position, a microphone located on the front of the housing can be brought forward. The sliding part is advantageously designed as part of the upper housing. According to another embodiment, the sliding part surrounds the entire camera housing in the manner of a sleeve.

Figure 2:
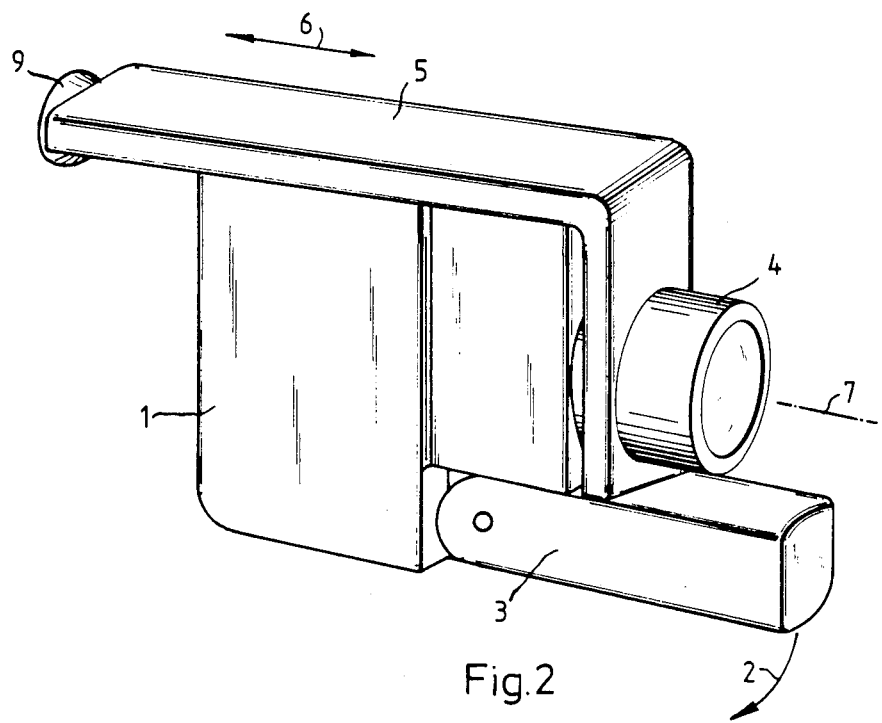

The invention is explained below with the aid of the drawings, applied to embodiments. Shown are:

FIG. 1 a camera with the sliding part in the forward end position;

FIG. 2 the same camera with the sliding part in the rearward end position.

Figure 3:
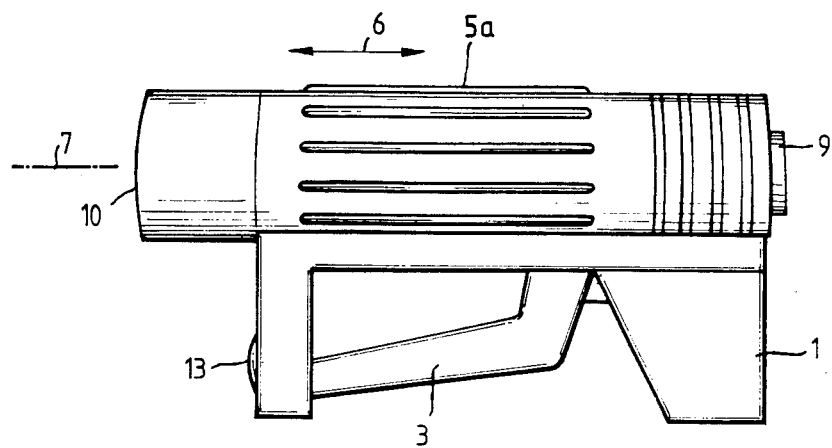
Figure 4:
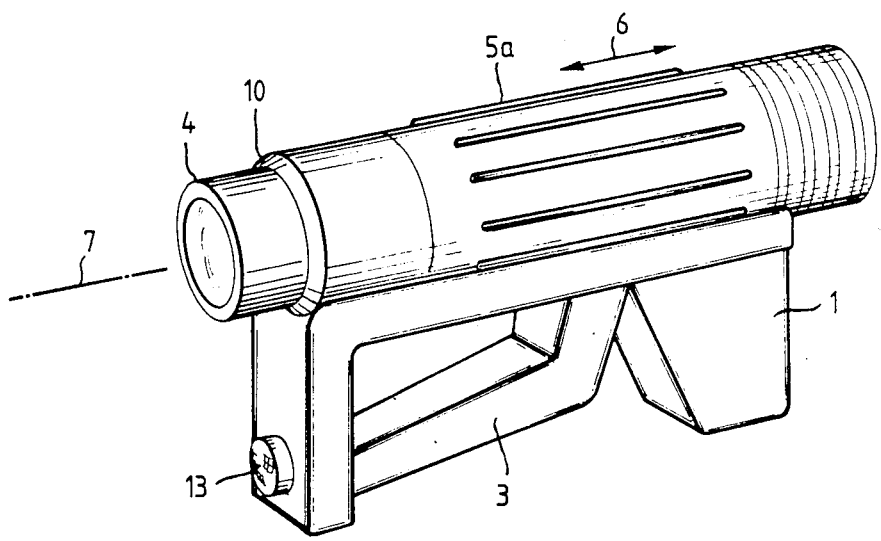

FIG. 3 another embodiment with the sliding part in the forward end position; and FIG. 4 the camera according to FIG. 3 with the sliding part in the rearward end position.

FIG. 1 shows a video camera with the housing 1, the carrying handle 3 which can be pulled out in direction 2, the lens 4, and the sliding part 5, which forms the upper part of the housing. The sliding part 5 is located so as to be moveable between two end positions in longitudinal direction 7 using a dovetail guide. FIG. 1 shows the forward end position of part 5. In this end position there is a bracket 8 in front of lens 4 and perpendicular to lens axis 7. In this way, protection is provided for lens 4 when the camera is e.g. carried, set down, or stored or transported together with other objects. The bracket 8 in front of lens 4 largely prevents foreign bodies from adversely affecting the lens. The end position of part 5 as illustrated thus represents the rest position of the camera which is not made ready for recording. At the rear end of part 5 is located the eyepiece 9 of the viewfinder, with which a built-in black and white monitor picture may be viewed. Bracket 8 is provided with an opening 10 which is somewhat larger than the maximum diameter of lens 4. The front surface 11 of bracket 8, and the surface 12 of handle 3 together form a stand perpendicular to lens axis 7, allowing the camera to be set down on a surface with the lens axis 7 in a vertical position.

FIG. 2 shown the camera according to FIG. 1 with the part 5 in the rear end position. When sliding occurs, lens 4 can pass through opening 10, so that all of lens 4 is uncovered. Lens 4 may then be operated manually without hindrance from the part 5, in particular to set distance, camera aperture, focal distance and zoom optics. At the same time, the eyepiece 9 is moved backwards. This sliding of the eyepiece 9 simultaneously sets the effective magnification for the viewfinder to the maximum value. The sliding of the part 5 from the position according to FIG. 1 to the position according to FIG. 2 thus produces the operating mode of the camera in which the lens is uncovered, and at the same time the viewfinder with eyepiece 9 is set to maximum magnification of the monitor picture.

The two end positions according to FIGS. 1 and 2 are advantageously designed as locking positions, since practically speaking only the two end positions are of importance and intermediate positions are not required.

In FIG. 3, the sliding part 5a is designed in the shape of a sleeve and coaxially surrounds all of camera housing 1, whose upper part is cylinderical in design. Cover and protection for the lens 4 are provided in that the front end of the tubular part 5a completely surrounds the lens 4. The recording microphone 13 is located on the front of the housing 1. The mounting of the microphone 13 is coupled to the sliding part 5a in such a manner that in the rearward end position of part 5a, the microphone 13 is automatically brought forward. The manual pulling-out of the microphone for recording, which is necessary in some video cameras, is thus dispensed with. All operating and display elements are arranged at the rear end of housing 1. The operation and manipulation of the camera is thus equally suited for right and left-handed users. Eyepiece 9 of the viewfinder is again at the rear end of part 5a.

FIG. 4 shows the operating position of the camera according to FIG. 3 with part 5a in the rear end position. The lens 4 is uncovered for manual operation. The eyepiece 9 at the rear end is again moved backwards, which provides for the adjustment of the viewfinder to maximum magnification. In this example, the handle 3 does not swivel, but forms a rigid part of the housing 1. At the rear end of handle 3 a switch for switching the recording mode on and off is also accommodated.

The movement of the sliding part 5 into the rearward end position i.e. the actual working position, according to FIGS. 2 or 4, can be effected by an energy accumulator. For example, when part 5 is slid into the forward end position according to FIGS. 1, 3, a spring is tensioned and the part 5 locks. In order to slide part 5 into the rearward end position, a button is pressed, causing the spring to slide the part 5 back into the rearward end position quickly and automatically. With this design, handling can be further simplified, and in particular, the time it takes to put the camera into operation can be shortened. This is particularly advantageous in the case of subjects which appear very briefly and unexpectedly, such as e.g. in nature.

In addition, switches can be coupled to the sliding part 5, which switches, in the forward end position according to FIGS. 1, 3, i.e. the locking position, automatically switch off specific operating functions, and in the rearward end position, automatically switch them on. This eliminates the need for additional handling for switching off certain functions, and it avoids the possibility that the switching off is forgotten. In this way, components may be treated gently or energy saved, irrespective of whether the camera's energy supply is from a video recorder or from built-in batteries.

I claim:

1. In a video camera comprising a housing having a longitudinal dimension, a lens mounted in the housing, and a viewfinder carried by the housing for observing the scene to be recorded, the improvement comprising: a part mounted on said housing for sliding movement in the direction of the longitudinal dimension of said housing between a forward end position in which said part provides protection for said lens and a rear end position in which said part uncovers said lens.

2. Camera according to claim 1 wherein said part has a rear end, said viewfinder has an eyepiece carried by said rear end, and said viewfinder is constructed to provide maximum magnification of scene detail when said part is in said rear end position.

3. A camera according to claim 1 wherein said part has a front end equipped with a bracket extending perpendicular to the axis of said lens and having an opening for passage of said lens.

4. Camera according to claim 1 wherein said bracket has a front surface constituting a support on which to stand said camera.

5. Camera according to claim 1 wherein said part forms the upper portion of said housing.

6. Camera according to claim 1 wherein said housing is cylindrical and said part has the form of a sleeve which surrounds said housing.

7. Camera according to claim 1 further comprising a microphone mounted at the same end of said housing as said lens.

8. Camera according to claim 1 further comprising an energy accumulator connected to move said part into said rear end position.

9. Camera according to claim 8 wherein said energy accumulator comprises a spring connected to be tensioned when said part is slid into said forward end position and is releasable for permitting said part to slide automatically into said rear end position.

10. Camera according to claim 1 further comprising switches coupled to said part for automatically switching off operating functions when said part is in said forward end position and automatically switching on operating functions when said part is in said rear end position.

* * * * *